(12) United States Patent
George et al.

(10) Patent No.: US 12,515,535 B2
(45) Date of Patent: Jan. 6, 2026

(54) TECHNIQUES FOR DYNAMIC WHEEL SLIP TARGET CONTROL IN MULTI-MOTOR ELECTRIFIED VEHICLES

(71) Applicant: FCA US LLC, Auburn Hills, MI (US)

(72) Inventors: Alexander J George, Whitmore Lake, MI (US); Chunjian Wang, Troy, MI (US); Drushan Mavalankar, Rochester Hills, MI (US)

(73) Assignee: FCA US LLC

( * ) Notice: Subject to any disclaimer, the term of this patent is extended or adjusted under 35 U.S.C. 154(b) by 280 days.

(21) Appl. No.: 18/192,034

(22) Filed: Mar. 29, 2023

(65) Prior Publication Data
US 2024/0326608 A1 Oct. 3, 2024

(51) Int. Cl.
*B60L 15/20* (2006.01)
*B60L 3/00* (2019.01)

(52) U.S. Cl.
CPC ......... *B60L 15/2036* (2013.01); *B60L 3/0061* (2013.01); *B60L 2240/46* (2013.01)

(58) Field of Classification Search
CPC . B60L 15/2036; B60L 3/0061; B60L 2240/46
See application file for complete search history.

(56) References Cited

U.S. PATENT DOCUMENTS

| 9,488,987 | B2 | 11/2016 | Goulding |
| 9,731,599 | B2 | 8/2017 | Gagnon |
| 9,791,860 | B2 | 10/2017 | Phillips et al. |
| 11,277,956 | B2 | 3/2022 | Bertucci et al. |
| 2004/0040758 | A1* | 3/2004 | Shimizu ................. B60L 15/20 903/902 |
| 2010/0204887 | A1* | 8/2010 | Ichinose ............. B60L 15/2036 701/41 |
| 2010/0222953 | A1* | 9/2010 | Tang ...................... B60L 15/20 701/22 |
| 2020/0255017 | A1* | 8/2020 | Siokos ................. B60K 17/354 |
| 2020/0369257 | A1* | 11/2020 | Hu ........................ B60W 10/20 |
| 2022/0101662 | A1 | 3/2022 | Griffin et al. |

(Continued)

FOREIGN PATENT DOCUMENTS

| CN | 114954038 A | * | 8/2022 | ............. B60K 17/02 |
| CN | 217706096 U | | 11/2022 | |

OTHER PUBLICATIONS

English translation of Yan (CN 114954038) (Year: 2022).*

*Primary Examiner* — Kyle J Kingsland
(74) *Attorney, Agent, or Firm* — Jeremy J. Klobucar

(57) ABSTRACT

Dynamic slip target control systems and method for a multi-motor electrified powertrain of an electrified vehicle including a driveline having four wheels involve determining (i) a steering angle of the driveline of the electrified vehicle, (ii) a vehicle speed of the electrified vehicle, and (iii) a wheel speed of each the four wheels of the driveline, dynamically determining a target wheel slip based on a wheel speed model with inputs including the steering angle and vehicle speed, determining an expected differential speed based on the dynamically determined target wheel slip, determining a torque bias adjustment based on a difference between wheel speed errors and the expected differential speed, and controlling two or more electric motors of the multi-motor electrified powertrain based on an estimated torque bias and the torque bias adjustment.

18 Claims, 3 Drawing Sheets

(56) References Cited

U.S. PATENT DOCUMENTS

| | | |
|---|---|---|
| 2023/0022383 A1 | 1/2023 | Madineni |
| 2023/0115854 A1* | 4/2023 | Iwama .................. B60L 3/102 |
| | | 701/22 |

* cited by examiner

TECHNIQUES FOR DYNAMIC WHEEL SLIP TARGET CONTROL IN MULTI-MOTOR ELECTRIFIED VEHICLES

FIELD

The present application generally relates to electrified vehicles and, more particularly, to techniques for dynamic wheel slip target control in multi-motor electrified vehicles.

BACKGROUND

In conventional four-wheel vehicles, there are four contact patches that support the vehicle's weight and through which force is applied for propulsive power. This applied force is the drive torque generated by a powertrain, which could include an internal combustion engine, an electric motor, or some combination thereof. These conventional vehicles often employ four-wheel drive (4WD) systems having "lockers" to improve wheel/tire grip performance in off-road environments. These "lockers" are mechanical devices that defeat a differential to force power distribution from equal torque and variable speed to equal speed and variable torque. In other words, these systems force all of the wheels to rotate at the same speed, regardless of steering input or terrain variation. This can cause driveline windup, "crow hop," and poor responsiveness when attempting to steer. Accordingly, while such conventional four-wheel vehicles and their control systems and methods do work well for their intended purpose, there exists an opportunity for improvement in the relevant art.

SUMMARY

According to one example aspect of the invention, a dynamic slip target control system for a multi-motor electrified powertrain of an electrified vehicle including a driveline having four wheels is presented. In one exemplary implementation, the dynamic slip target control system comprises a set of sensors configured to determine (i) a steering angle of the driveline of the electrified vehicle, (ii) a vehicle speed of the electrified vehicle, and (iii) a wheel speed of each the four wheels of the driveline and a controller configured to dynamically determine a target wheel slip based on a wheel speed model with inputs including the steering angle and vehicle speed, determine an expected differential speed based on the dynamically determined target wheel slip, determine a torque bias adjustment based on a difference between wheel speed errors and the expected differential speed, and control two or more electric motors of the multi-motor electrified powertrain based on an estimated torque bias and the torque bias adjustment, wherein the control of the two or more electric motors causes the electrified vehicle to accurately track a desired trajectory corresponding to the steering angle and without locking any components of the driveline.

In some implementations, the controller is further configured to perform an open-loop calculation of the estimated torque bias based on a load estimate on each of the four wheels. In some implementations, the controller is further configured to perform the open-loop calculation of the estimated torque bias based on (i) the four load estimates on the four wheels corresponding to a driver torque request and (ii) a known front/rear weight split of the electrified vehicle, to determine front/rear torque fractions indicative of the estimated torque bias In some implementations, the control of the two or more electric motors achieves torque vectoring to maintain yaw control of the driveline with only two or more gripping patches via the four wheels. In some implementations, the controller is configured to apply rear differential torque to steer the electrified vehicle when the front two wheels have no grip and vice-versa.

In some implementations, the determining of the torque bias adjustment includes applying an aggressively tuned proportional-integral-derivative (PID) controller based on the difference between the wheel speeds and the expected differential speed. In some implementations, the aggressively tuned PID controller has a PID governor target adjusted to a speed differential representing zero wheel slip on flat, dry pavement. In some implementations, the electrified powertrain comprises two or three independent electric motors and one or more intermediary driveline components therebetween the two or three electric motors and the four wheels of the driveline. In some implementations, the electrified powertrain comprises four independent electric motors associated with the four wheels of the driveline, respectively.

According to another example aspect of the invention, a dynamic slip target control method for a multi-motor electrified powertrain of an electrified vehicle including a driveline having four wheels is presented. In one exemplary implementation, the method comprises determining, by a controller of the electrified vehicle and using a set of sensors of the electrified vehicle, (i) a steering angle of the driveline of the electrified vehicle, (ii) a vehicle speed of the electrified vehicle, and (iii) a wheel speed of each the four wheels of the driveline, dynamically determining, by the controller, a target wheel slip based on a wheel speed model with inputs including the steering angle and vehicle speed, determining, by the controller, an expected differential speed based on the dynamically determined target wheel slip, determining, by the controller, a torque bias adjustment based on a difference between wheel speed errors and the expected differential speed, and controlling, by the controller, two or more electric motors of the multi-motor electrified powertrain based on an estimated torque bias and the torque bias adjustment, wherein the controlling of the two or more electric motors causes the electrified vehicle to accurately track a desired trajectory corresponding to the steering angle and without locking any components of the driveline.

In some implementations, the method further comprises performing, by the controller, an open-loop calculation of the estimated torque bias based on a load estimate on each of the four wheels. In some implementations, performing the open-loop calculation of the estimated torque bias based on (i) the four load estimates on the four wheels corresponds to a driver torque request and is further based on (ii) a known front/rear weight split of the electrified vehicle, to determine front/rear torque fractions indicative of the estimated torque bias. In some implementations, the controlling of the two or more electric motors achieves torque vectoring to maintain yaw control of the driveline with only two or more gripping patches via the four wheels. In some implementations, the method further comprises further comprising applying, by the controller, rear differential torque to steer the electrified vehicle when the front two wheels have no grip and vice-versa.

In some implementations, the determining of the torque bias adjustment includes applying an aggressively tuned proportional-integral-derivative (PID) controller based on the difference between the wheel speeds and the expected differential speed. In some implementations, the aggressively tuned PID controller has a PID governor target adjusted to a speed differential representing zero wheel slip on flat, dry pavement. In some implementations, the electrified powertrain comprises two or three independent electric motors and one or more intermediary driveline components therebetween the two or three electric motors and the four wheels of the driveline. In some implementations, the electrified powertrain comprises four independent electric motors associated with the four wheels of the driveline, respectively.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, conventional four-wheeled vehicles often employ four-wheel drive (4WD) systems having "lockers" to improve wheel/tire grip performance in off-road environments. These "lockers" are mechanical devices that defeat a differential to force power distribution from equal torque and variable speed to equal speed and variable torque. In other words, these systems force all of the wheels to rotate at the same speed, regardless of steering input or terrain variation. This causes driveline windup, "crow hop," and poor responsiveness when attempting to steer. Alternate solutions include limited slip differentials or leaving the locking differentials unlocked and then controlling wheel spin with a reactive, brake-based system. Such reactive brake-based solutions, however, offer relatively poor performance.

Accordingly, improved techniques for dynamic wheel slip target control in multi-motor electrified vehicles are presented. These techniques utilize steering wheel angle and vehicle speed to calculate an expected differential between front/rear axles and left/right wheels of each axle and then rigidly enforce these targets. This is possible by independently controlling multiple motors of an electrified powertrain. This solution offers all of the benefits of a locking transfer case and differentials as described above with little to none of the above-described performance drawbacks. These techniques apply to four motor (one electric motor per wheel) electrified powertrains as well as two and three electric motor electrified powertrain configurations (e.g., by via differential braking control, also known as "brake lock differential" or BLD).

Figure 1:
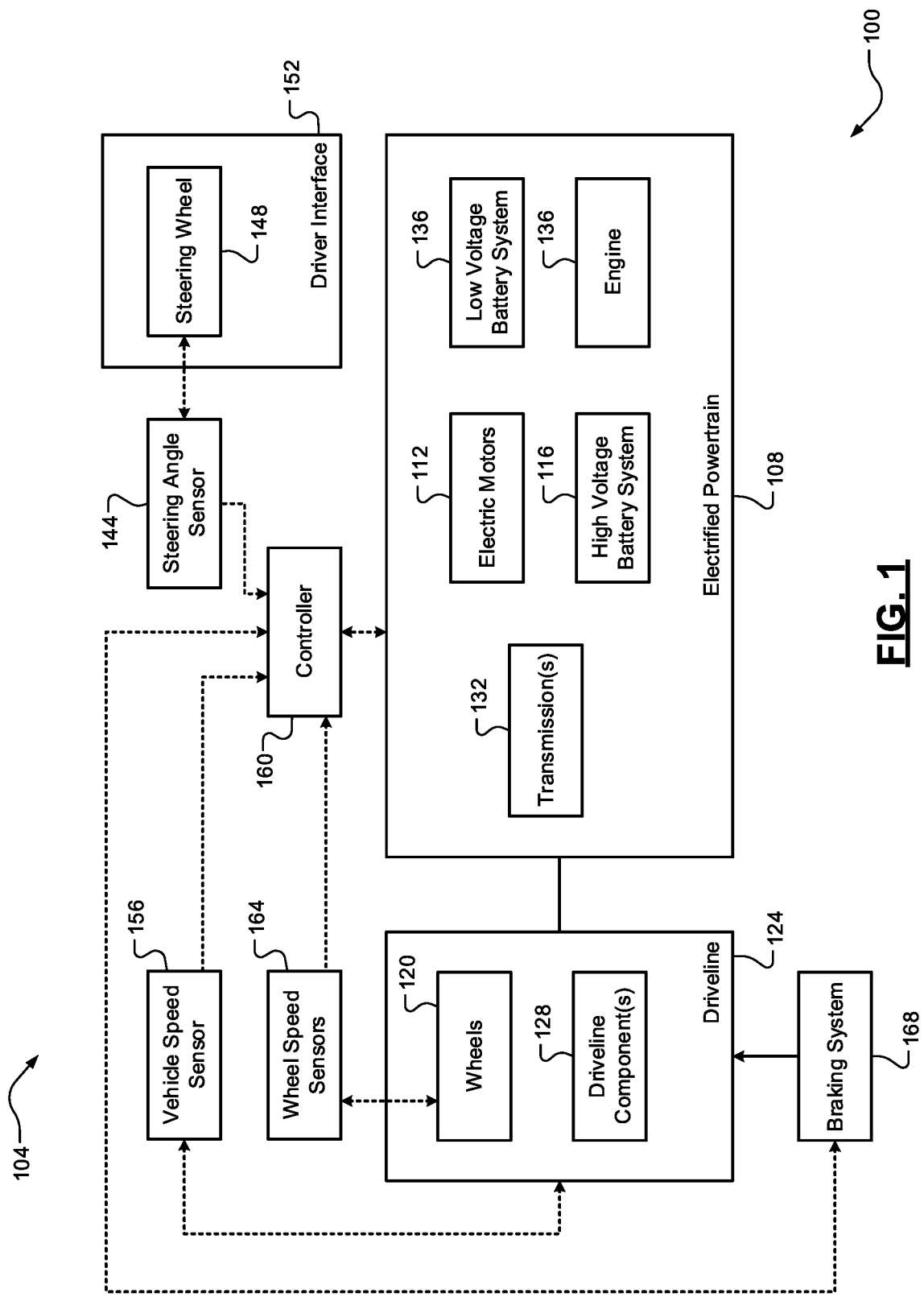
FIG. 1 is a functional block diagram of an electrified vehicle having an example dynamic slip target control system according to the principles of the present application.

Referring now to FIG. 1, a functional block diagram of an electrified vehicle 100 having an example dynamic slip target control system 104 according to some implementations of the present application is illustrated. The electrified vehicle 100 includes an electrified powertrain 108 having two or more electric motors 112-1 . . . 112-N (collectively, "electric motors 112," where N is an integer≥2), also referred to as "multi-motor electrified powertrain 108." Each electric motor 112 is configured to generate mechanical drive torque using electrical energy from a high voltage battery system 116. While a single high voltage battery system 116 is shown, it will be appreciated that the electrified powertrain 108 could include a plurality of high voltage battery systems 116 (e.g., one per electric motor, or N total). Some of the electric motor(s) 112 could be configured to provide drive torque directly to one of four wheels 120 of a driveline 124 the electrified vehicle 100, whereas other electric motor(s) 112 could be configured to provide torque to at least some of the wheels 120 via intermediary driveline components 128 (e.g., differentials, etc.). One or more optional transmissions 132 (e.g., an automatic transmission) could also be implemented and configured to transfer the drive torque from the electric motor(s) 112 to the wheels 120 or the intermediary driveline components 128.

An optional internal combustion engine 136 could also be implemented and configured to combust a mixture of air and fuel (gasoline, diesel, etc.) to generate drive torque for propulsion and/or recharging of the high voltage battery system 116 (e.g., while operating as a generator to generate electrical energy). If the engine 136 is configured to generate drive torque for propulsion, then its contribution of to the total amount of drive torque for distribution amongst the four wheels 120 must be properly accounted for. The electrified powertrain 108 also includes a low voltage battery system 140 for powering low voltage accessory components of the electrified powertrain 108 or of the electrified vehicle 100 in general. A steering angle sensor 144 is configured to measure a steering angle of the driveline 124, such as provided by an operator/driver via a steering wheel 148 of a driver interface 152 of the electrified vehicle 100. A vehicle speed sensor 156 is configured to measure a vehicle speed of the electrified vehicle 100.

A controller 160 is configured to control operation the electrified powertrain 108, such as based on a driver torque request via the driver interface 152 (e.g., an accelerator pedal). Wheel speed sensors 164 are also configured to measure or otherwise sense rotational speeds (e.g., for wheel slip determination) of each of the four wheels 120. It will be appreciated that the electrified vehicle 100 could not have a separate vehicle speed sensor 156 as shown (e.g., a transmission output shaft speed sensor), and instead could be a model or algorithm that determines or estimates vehicle speed based on other variables, such as based on the measured wheel speeds from the wheel speed sensors 164. A braking system 164 (e.g., an anti-lock braking system, or ABS) is also configured to selectively apply braking force to the driveline 124 (e.g., the wheels 120). This braking system 164 could be utilized to control trimming or torque for left/right wheel splits (also previously described as differential braking, or BLD) for driveline axles having a single electric motor 112 associated therewith and optional intermediary driveline component(s) 128 therebetween.

Per the techniques of the present application, the controller 160 is configured to utilize steering angle and vehicle speed to calculated an "expected" speed differential between front/rear axles and between left/right wheels of each axle and thereafter rigidly enforce this target. This allows for an enhanced differentiation between "good" (e.g., normally allowable) slip and "bad" slip. In other words, the magnitude of the slip error encountered is reduced thereby allowing for much more aggressive tuning of a feedback (e.g., proportional-integral-derivative, or PID) controller. The achieved grip characteristics are similar to that of a conventional "triple locker" driveline but without the associated drawbacks as previously described herein. The techniques are usable in any operating conditions, from off-road to ice to dry pavement, with reduced/eliminated driveline binding on pavement and no "crow hop" or "plowing" (understeer). This effectively achieves torque-vectoring by default by maintaining yaw control with only two (or more) gripping contact patches and the rear axle being supplied and applying differential torque to steer the electrified vehicle 100 if the front wheels have no grip and vice-versa. In one example implementation, this provides for a split positive/negative torque distribution, which could be utilized in addition to further controls to performing a "tank turn." The specific calculations of the controller 160 will now be described in greater detail.

Figure 2:
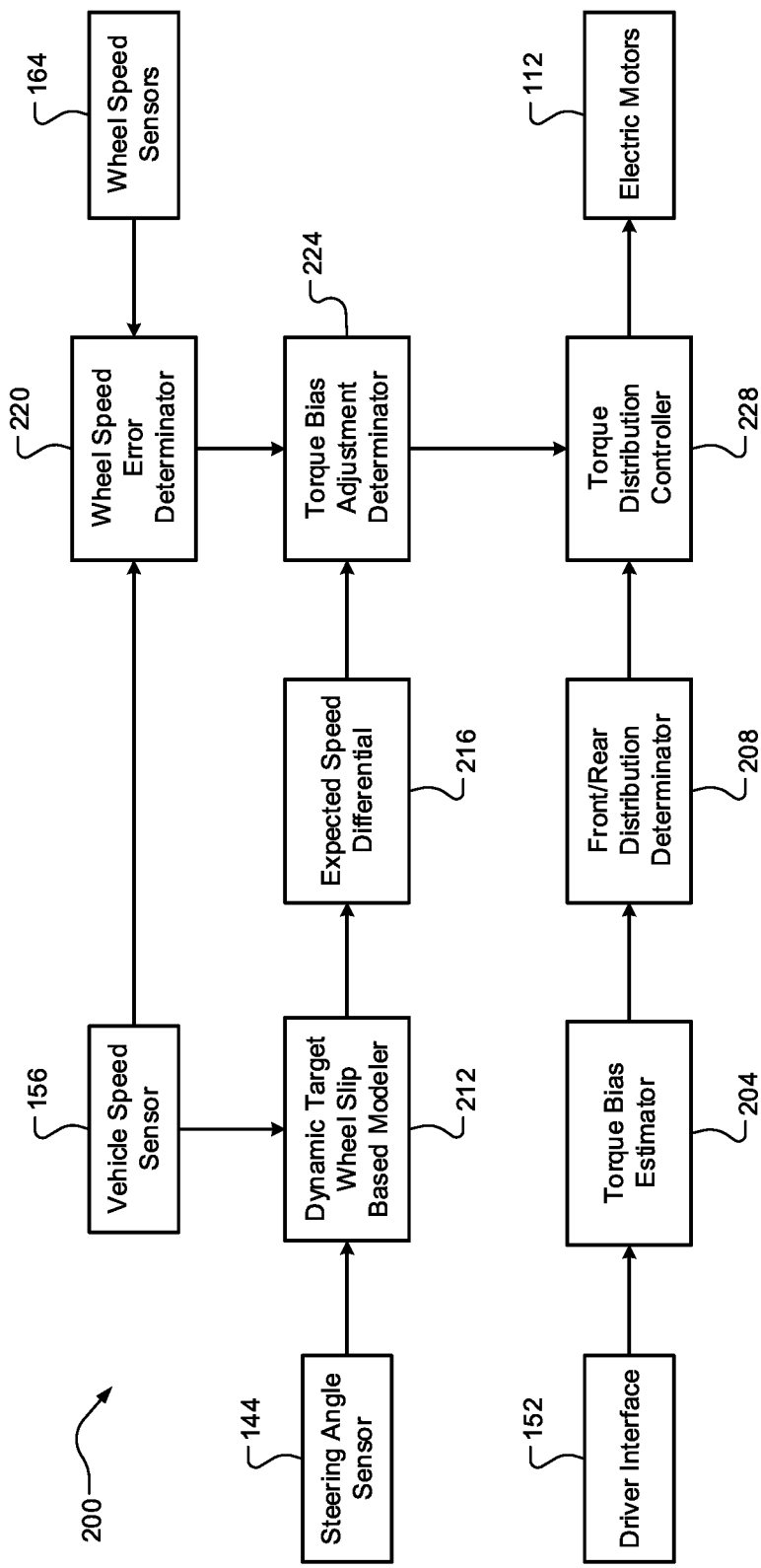
FIG. 2 is a functional block diagram of an example dynamic slip target control architecture according to the principles of the present application.

Referring now to FIG. 2 and with continued reference to FIG. 1, a functional block diagram of an example dynamic slip target control architecture 200 according to the principles of the present application is illustrated. The architecture 200 includes a torque bias estimator 204, a front/rear distribution determinator 208, a dynamic target wheel slip based modeler 212, an expected speed differential determinator 216, a wheel speed error determinator 220, a torque bias adjustment determinator 224, and a torque distribution controller 228. The torque bias estimator 204 is configured to estimate a torque bias based on a driver torque requested provided by an operator/driver of the electrified vehicle 100 via the driver interface 152 (e.g., an accelerator pedal). The front/rear distribution determinator 208 factors into the estimated torque bias a known front/rear weight percentage split for the electrified vehicle 100 (e.g., having no additional loads). The dynamic target wheel slip based modeler 212 utilizes a wheel speed model to dynamically determine a target wheel slip for the electrified vehicle 100. This wheel speed model utilizes the steering angle and vehicle speed (from respective sensors 144, 156) as inputs to dynamically determine the target wheel slip. This wheel speed model, for example, could be generated and calibrated based on collected test data.

The expected speed differential determinator 216 determines or represents an expected speed differential for the electrified vehicle 100 based on the dynamically determined target wheel slip. This expected speed differential (e.g., between front/rear axles and between left/right wheels of each axle) is thereafter rigidly enforced as a target as previously described. The wheel speed error determinator 220 determines wheel speed error based on differences between the vehicle speed (as determined/measured by vehicle speed sensor 156) and determined (i.e., measured) rotational speeds of the wheels 120 from wheel speed sensors 164. The torque bias adjustment determinator 224 determines a torque bias adjustment based on a difference between the wheel speed errors and the expected differential speed. The rigid enforcement of this target allows for an aggressively tuned feedback (e.g., PID) controller to be utilized by the determinator 224. For example, a PID governor target could be adjusted to a speed differential representing zero wheel slip on flat, dry pavement. Finally, the torque distribution controller 228 determines a torque distribution for the four wheels 120 (front/rear, left/right, etc.) for the electric motors 112 based on the estimated torque bias and the torque bias adjustment. This could also involve other sub-controllers, such as a current controller and inverter for the electric motors 112.

Figure 3:
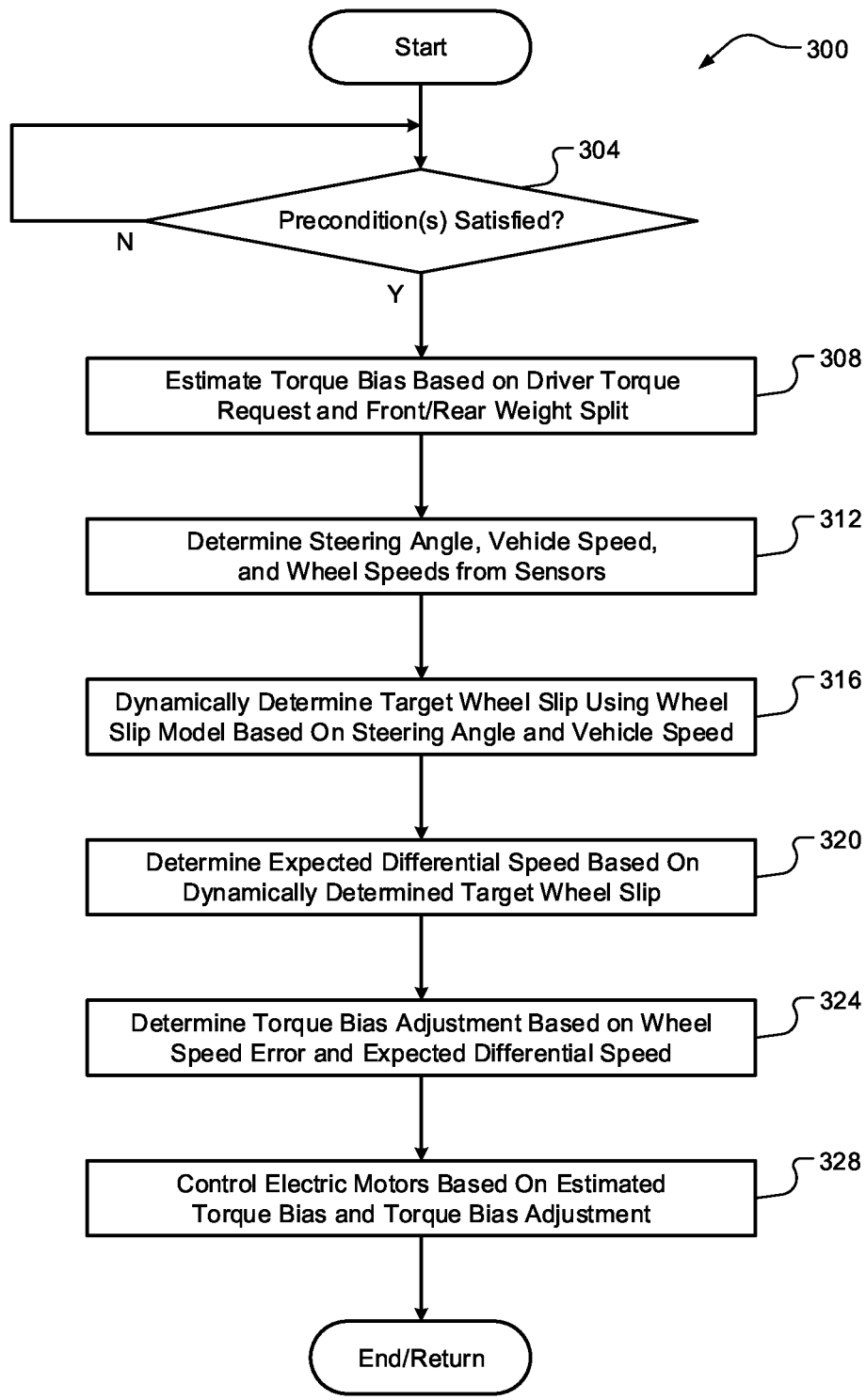
FIG. 3 is a flow diagram of an example dynamic slip target control method for an electrified vehicle according to the principles of the present application.

Referring now to FIG. 3, a flow diagram of an example dynamic slip target control method 300 for an electrified vehicle according to the principles of the present application is illustrated. While the electrified vehicle 100 and its components are specifically referenced for illustrative/descriptive purposes, it will be appreciated that the method 300 could be applicable to any suitable electrified vehicle having a multi-motor electrified powertrain. At optional 304, the controller 152 determines whether a set of precondition(s) are satisfied. Non-limiting examples of these precondition(s) include the electrified powertrain 108 being fully enabled/operational and no malfunctions or faults being currently present. When true, the method 300 proceeds to 308. Otherwise, the method 300 ends or returns to 304. At 308, the controller 160 estimates a torque bias based on a driver torque (e.g., via the driver interface 152) and a known front/rear weight slip of the electrified vehicle 100.

At 312, the controller 160 determines steering angle, vehicle speed, and wheel speeds from the respective sensors 144, 156, 164. At 316, the controller 160 dynamically determines a target wheel slip using a wheel speed model based on the steering angle and vehicle speed. At 320, the controller 160 determines an expected differential speed based on the dynamically determined target wheel slip. At 324, the controller 160 determines a torque bias adjustment based on wheel speed error(s) and the expected differential speed. At 328, the controller 160 controls the electric motors 112 based on the estimated torque bias and the torque bias adjustment (e.g., a sum of these two values). The method 300 then ends or returns to 304 for one or more additional cycles.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A dynamic slip target control system for a multi-motor electrified powertrain of an electrified vehicle including a driveline having four wheels, the dynamic slip target control system comprising:
  a set of sensors configured to determine (i) a steering angle of the driveline of the electrified vehicle, (ii) a vehicle speed of the electrified vehicle, and (iii) a wheel speed of each the four wheels of the driveline; and
  a controller configured to:
    dynamically determine a target wheel slip for the four wheels of the driveline, collectively, based on a wheel speed model with inputs including the steering angle and vehicle speed;

determine, based on the dynamically determined target wheel slip, an expected differential speed (i) between front and rear axles of the driveline and (ii) between opposing pairs of the four wheels for each of the front and rear axles;

determine a torque bias adjustment based on a difference between wheel speed errors and the expected differential speed; and control two or more electric motors of the multi-motor electrified powertrain based on an estimated torque bias and the torque bias adjustment, wherein the control of the two or more electric motors causes the electrified vehicle to accurately track a desired trajectory corresponding to the steering angle and without locking any components of the driveline.

2. The dynamic slip target control system of claim 1, wherein the controller is further configured to perform an open-loop calculation of the estimated torque bias based on a load estimate on each of the four wheels.

3. The dynamic slip target control system of claim 2, wherein the controller is further configured to perform the open-loop calculation of the estimated torque bias based on (i) the four load estimates on the four wheels corresponding to a driver torque request and (ii) a known front/rear weight split of the electrified vehicle, to determine front/rear torque fractions indicative of the estimated torque bias.

4. The dynamic slip target control system of claim 1, wherein the control of the two or more electric motors achieves torque vectoring to maintain yaw control of the driveline with only two or more gripping patches via the four wheels.

5. The dynamic slip target control system of claim 4, wherein the controller is configured to apply rear differential torque to steer the electrified vehicle when the front two wheels have no grip and vice-versa.

6. The dynamic slip target control system of claim 1, wherein the determining of the torque bias adjustment includes applying a tuned proportional-integral-derivative (PID) controller based on the difference between the wheel speeds and the expected differential speed.

7. The dynamic slip target control system of claim 6, wherein the tuned PID controller has a PID governor target adjusted to a speed differential representing zero wheel slip on flat, dry pavement.

8. The dynamic slip target control system of claim 1, wherein the electrified powertrain comprises two or three independent electric motors and one or more intermediary driveline components therebetween the two or three electric motors and the four wheels of the driveline.

9. The dynamic slip target control system of claim 1, wherein the electrified powertrain comprises four independent electric motors associated with the four wheels of the driveline, respectively.

10. A dynamic slip target control method for a multi-motor electrified powertrain of an electrified vehicle including a driveline having four wheels, the method comprising:

determining, by a controller of the electrified vehicle and using a set of sensors of the electrified vehicle, (i) a steering angle of the driveline of the electrified vehicle, (ii) a vehicle speed of the electrified vehicle, and (iii) a wheel speed of each the four wheels of the driveline;

dynamically determining, by the controller, a target wheel slip for the four wheels of the driveline, collectively, based on a wheel speed model with inputs including the steering angle and vehicle speed;

determining, by the controller and based on the dynamically determined target wheel slip, an expected differential speed, an expected differential speed (i) between front and rear axles of the driveline and (ii) between opposing pairs of the four wheels for each of the front and rear axles;

determining, by the controller, a torque bias adjustment based on a difference between wheel speed errors and the expected differential speed; and controlling, by the controller, two or more electric motors of the multi-motor electrified powertrain based on an estimated torque bias and the torque bias adjustment, wherein the controlling of the two or more electric motors causes the electrified vehicle to accurately track a desired trajectory corresponding to the steering angle and without locking any components of the driveline.

11. The method of claim 10, further comprising performing, by the controller, an open-loop calculation of the estimated torque bias based on a load estimate on each of the four wheels.

12. The method of claim 11, wherein performing the open-loop calculation of the estimated torque bias based on (i) the four load estimates on the four wheels corresponds to a driver torque request and is further based on (ii) a known front/rear weight split of the electrified vehicle, to determine front/rear torque fractions indicative of the estimated torque bias.

13. The method of claim 10, wherein the controlling of the two or more electric motors achieves torque vectoring to maintain yaw control of the driveline with only two or more gripping patches via the four wheels.

14. The method of claim 13, further comprising applying, by the controller, rear differential torque to steer the electrified vehicle when the front two wheels have no grip and vice-versa.

15. The method of claim 10, wherein the determining of the torque bias adjustment includes applying a tuned proportional-integral-derivative (PID) controller based on the difference between the wheel speeds and the expected differential speed.

16. The method of claim 15, wherein the tuned PID controller has a PID governor target adjusted to a speed differential representing zero wheel slip on flat, dry pavement.

17. The method of claim 10, wherein the electrified powertrain comprises two or three independent electric motors and one or more intermediary driveline components therebetween the two or three electric motors and the four wheels of the driveline.

18. The method of claim 10, wherein the electrified powertrain comprises four independent electric motors associated with the four wheels of the driveline, respectively.

* * * * *